US006095184A

United States Patent [19]

Neff et al.

[11] Patent Number: 6,095,184

[45] Date of Patent: Aug. 1, 2000

[54] PRESSURE REGULATOR WITH INTEGRATED CONTROL VALVE, ADJUSTABLE DOWNSTREAM PRESSURE BUILD AND QUICK EXHAUST

[75] Inventors: James A. Neff, Bloomfield, Mich.; Richard A. Fagerlie, New Smyrna Beach, Fla.

[73] Assignee: Mac Valves Inc., Wixom, Mich.

[21] Appl. No.: 09/340,265

[22] Filed: Jun. 30, 1999

Related U.S. Application Data

[60] Provisional application No. 60/091,224, Jun. 30, 1998.

[51] Int. Cl.[7] .................... F16K 31/12

[52] U.S. Cl. .................... 137/488; 137/115.21

[58] Field of Search .................... 137/115.18, 115.21, 137/487.5, 489.5, 488; 251/26

[56] References Cited

U.S. PATENT DOCUMENTS

| | | | |
|---|---|---|---|
| 3,279,484 | 10/1966 | Brinkel | 251/26 |
| 4,476,893 | 10/1984 | Schwelm | 137/487.5 |
| 4,579,042 | 4/1986 | Neff | 91/446 |
| 5,566,717 | 10/1996 | Robert | 137/883 |

*Primary Examiner*—Gregory L. Huson
*Assistant Examiner*—Ramesh Krishnamurthy
*Attorney, Agent, or Firm*—Bliss McGlynn, P.C.

[57] ABSTRACT

An integrated pneumatic pressure regulator assembly including a housing having an inlet adapted for fluid communication with a supply of pneumatic pressure, an outlet adapted for fluid communication with at least one pneumatically actuated device and an exhaust port. A pilot regulator valve is in fluid communication with the inlet and is operable to provide a pilot pressure. A pilot operated regulator valve is also provided in fluid communication with the inlet and the outlet. The pilot operated regulator valve is responsive to the pilot pressure to regulate the supply pressure from the inlet to a predetermined system pressure delivered through the outlet to a pneumatically actuated device during normal operation. An adjustable flow valve in fluid communication with the outlet is responsive to pilot pressure during initial actuation of a pneumatically actuated device to increase the pressure delivered to the outlet at a predetermined rate until the pressure at the outlet has substantially reached the predetermined system pressure. An exhaust valve is in fluid communication with the outlet and is operable to exhaust the system pressure through the exhaust port during shutdown of the pneumatically actuated device.

16 Claims, 7 Drawing Sheets

PRESSURE REGULATOR WITH INTEGRATED CONTROL VALVE, ADJUSTABLE DOWNSTREAM PRESSURE BUILD AND QUICK EXHAUST

This application claims the benefit of U.S. Provisional Application No. 60/091,224 filed Jun. 30, 1998.

BACKGROUND OF THE INVENTION

1. Field of the Invention

The invention relates, generally, to pressure regulators and, more specifically, to a pressure regulator having an integrated control valve with adjustable downstream pressure build and quick exhaust capabilities.

2. Description of the Related Art

Pressure regulators are well known in the art and are employed in numerous environments to regulate a pneumatic supply pressure to a predetermined system pressure. The system pressure is then supplied to various pneumatically actuated devices for operating same. It is also known in the art to employ flow control valves which are separate from the pressure regulators for further attenuating system pressure during start up of a pneumatically actuated device. These flow control valves act to slowly build the system pressure during start up, for example, at the beginning of a production shift. In this way, the pneumatically actuated devices are not shocked by a violent rise in pressure from 0 psi to the predetermined system pressure.

Similarly, it is also known to employ system control valves to supply system pressure. These valves are actuated, for example, during production start up. These valves may also include means for quickly exhausting system pressure, reducing it to 0 psi. System control valves sometimes are electrically operated or they may be manually operated. Additionally, system control valves sometimes employ means for locking the valve in the exhausted position. System control valves are actuated, for example, during the end of a production shift, during a break in production or any other circumstance which requires a quick end of the supply of system pressure to the pneumatic devices.

In present applications known in the related art, the pressure regulator, control valve, start up flow control valves, and system exhaust valves are each separately designed and engineered and selectively employed remote from one another in any given pneumatically actuated system. Each component is also separately controlled. Thus, these distinct components are usually incorporated at various positions relative to one another in the pneumatically actuated system, as the case may be, and interconnected via conduits or other flow passages.

While these separate components have generally worked well in the past, there remains an ongoing need in the art to simplify pneumatic systems and thereby lower costs of manufacture and/or assembly by eliminating separate components, shortening flow paths and thereby reducing related hardware.

SUMMARY OF THE INVENTION AND ADVANTAGES

The present invention overcomes the disadvantages of the related art in a pressure regulator assembly having an integrated control valve with adjustable downstream pressure build and quick exhaust capabilities. The assembly includes an inlet adapted for fluid communication with a supply of pneumatic pressure, at least one outlet adapted for fluid communication with at least one pneumatically actuated device and at least one exhaust port. A pilot regulator valve is provided in fluid communication with the inlet and is operable to provide a pilot pressure. A pilot operated regulator valve is also provided in fluid communication with the inlet and the outlet. The pilot operated regulator valve is responsive to the pilot pressure to regulate the supply of pressure from the inlet to a predetermined system pressure delivered through the outlet to a pneumatically actuated device during normal operation. In addition, the assembly includes an adjustable flow valve in fluid communication with the outlet and to control the rate at which the pilot pressure is delivered to the outlet and into the pneumatic system. Furthermore, the assembly also includes an exhaust valve in fluid communication with the outlet and operable to exhaust the system pressure through the exhaust port during shut down of the pneumatically actuated device.

One advantage of the present invention is that it provides a pressure regulator having integrated, slow pressure build and quick exhaust capabilities. Another advantage of the present invention is that it eliminates the need for separate start up, flow control valves as well as quick exhaust valves.

Another advantage of the present invention is that by eliminating separate components, the flow paths therebetween are shortened and the number of related hardware components are reduced. This simplifies the design of pneumatically actuated systems which leads to reduced costs, increased efficiency and convenience.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE PREFERRED EMBODIMENT(S)

An integrated pneumatic pressure regulator assembly of the present invention is generally indicated at 10 in FIGS.

Figure 4:
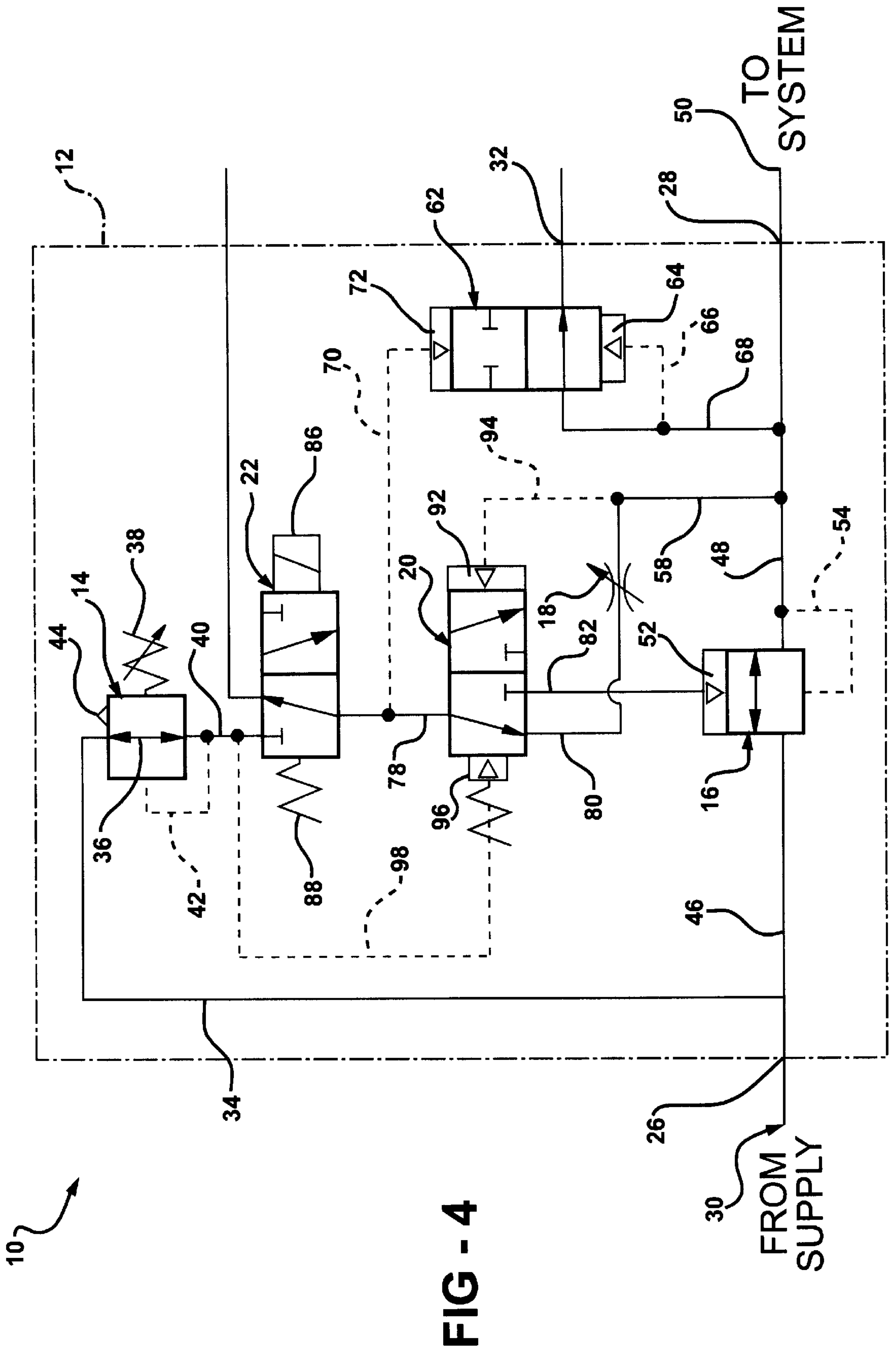
FIG. 4 is a schematic diagram of the integrated pneumatic pressure regulator assembly of the present invention illustrating the exhaust valve open and the system pressure exhausted.
Figure 6:
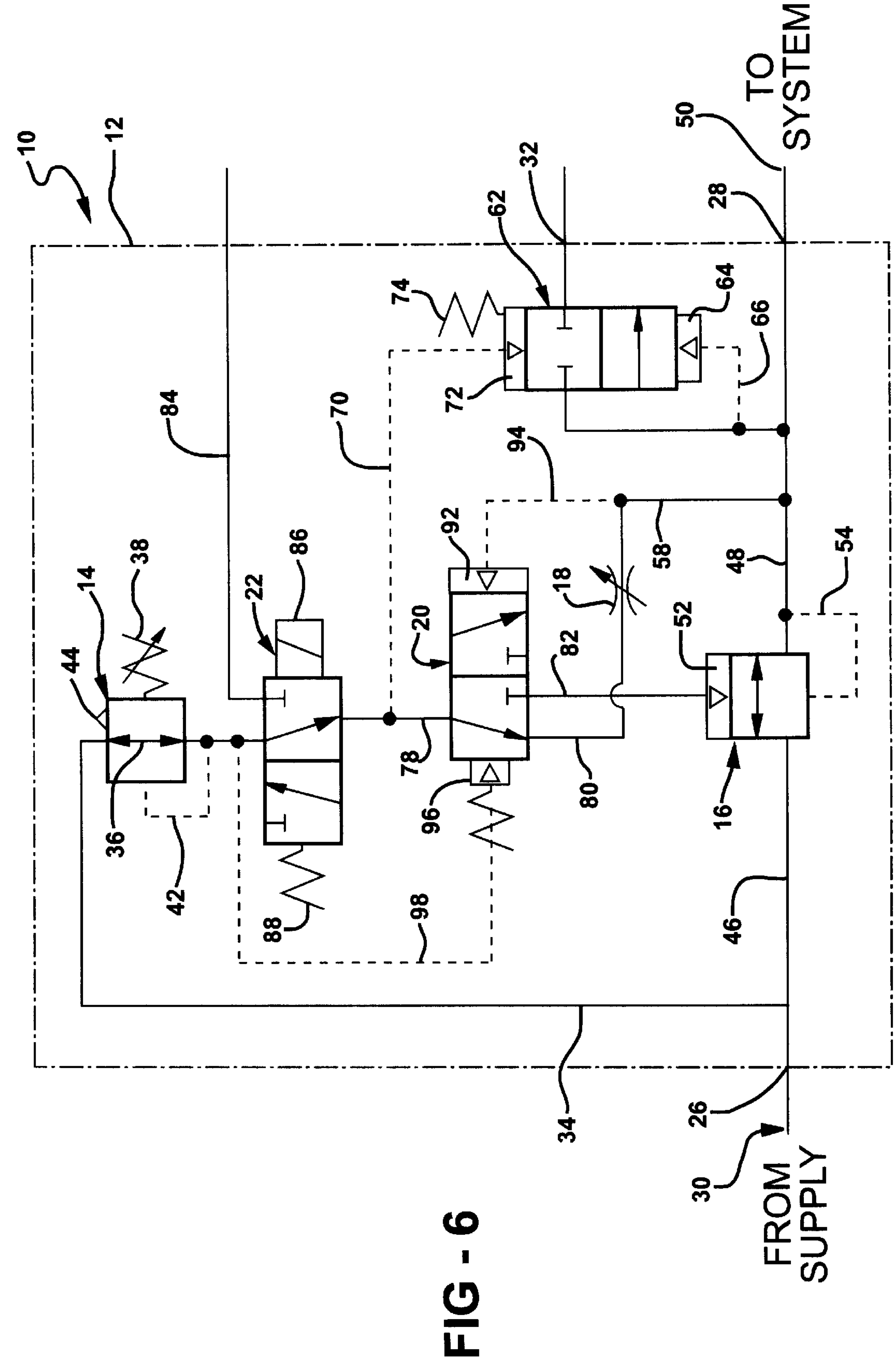
FIG. 6 is a schematic diagram of the integrated pneumatic pressure regulator assembly of the present invention illustrating pilot regulator pressure delivered to the adjustable flow valve.
Figure 7:
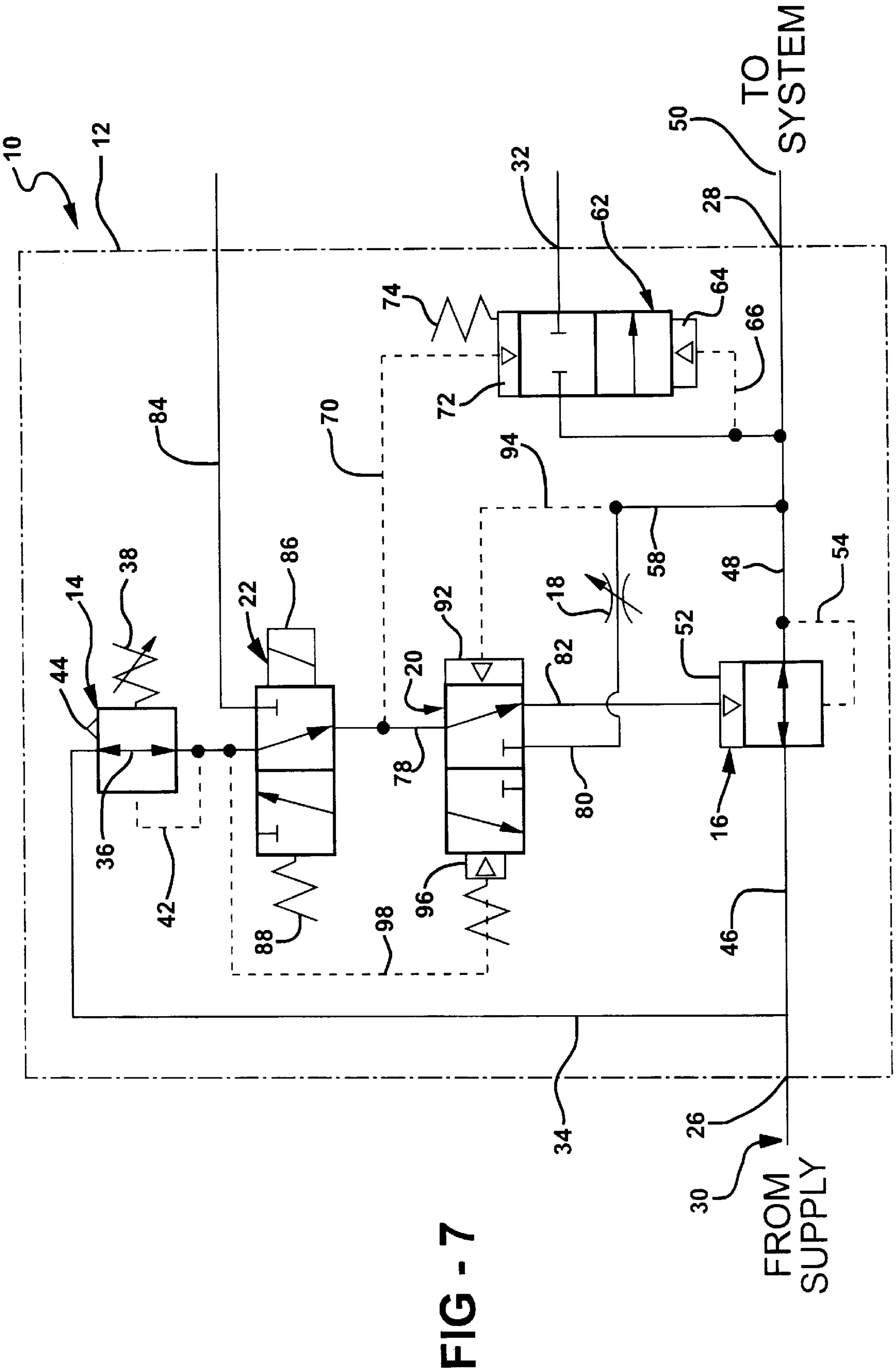
FIG. 7 is a schematic diagram of the integrated pneumatic pressure regulator assembly of the present invention illustrating pilot regulator pressure delivered to the regulator valve.
Figure 8:
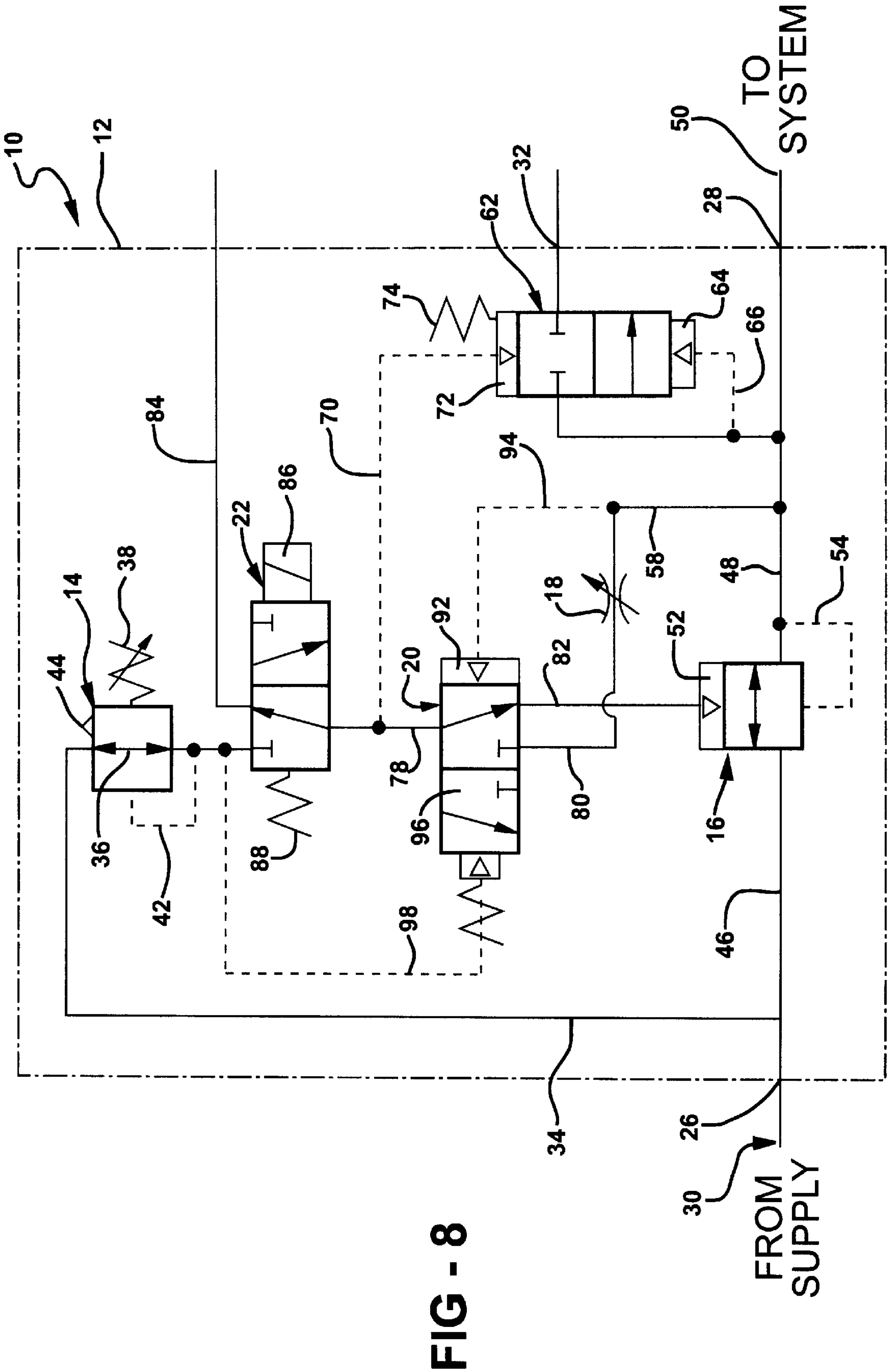
FIG. 8 is a schematic diagram of the integrated pneumatic pressure regulator assembly of the present invention illustrating pilot regulator pressure exhausted from the regulator valve.
Figure 9:
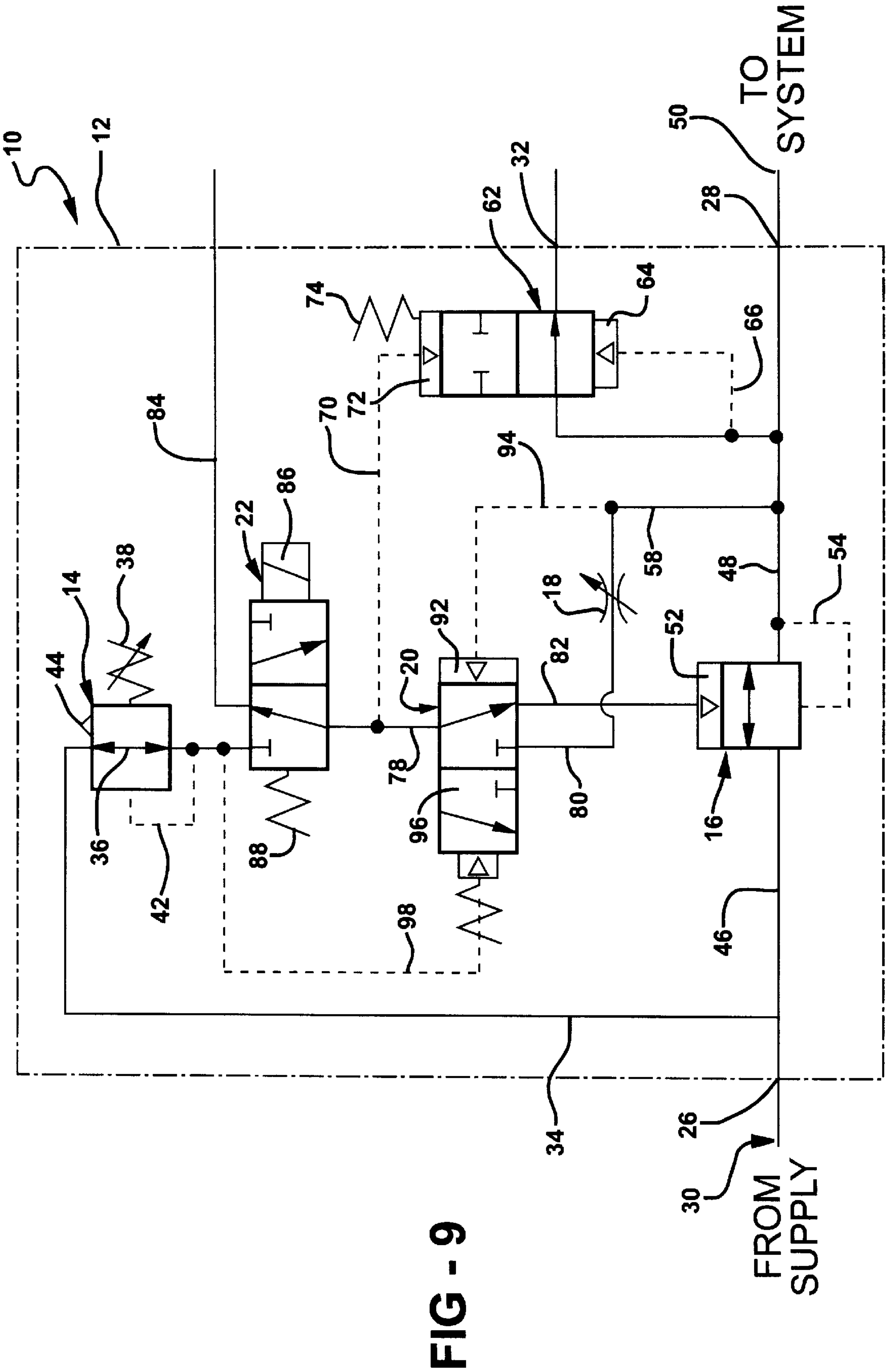
FIG. 9 is a schematic diagram of the integrated pneumatic pressure regulator assembly of the present invention illustrating the exhaust valve in the open condition.

1–3 and schematically in FIGS. 4–9, in its various operational modes. The pneumatic pressure regulator assembly 10 of the present invention is designed for use as a part of any number of pneumatically actuated systems to slowly increase the initial pressure to system pressure at the startup of a pneumatic device (FIG. 6), regulate the supply pressure to a system pressure (FIG. 7) and exhaust system pressure to 0 psig during shutdown (FIGS. 4, 8 and 9).

Figure 3:
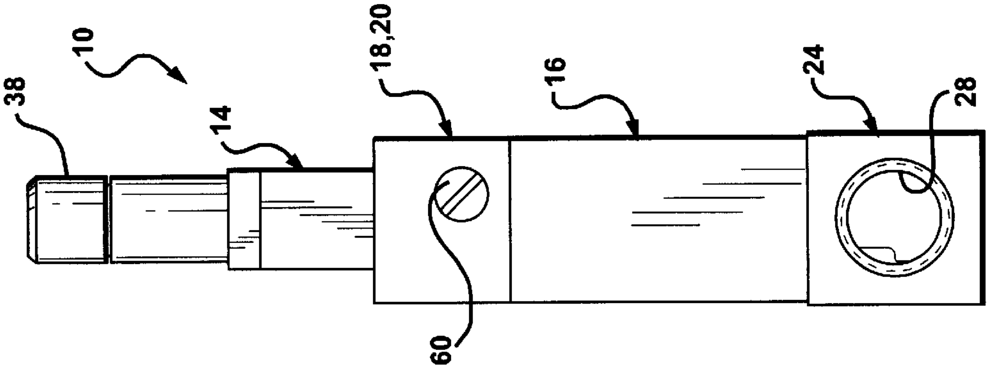
FIG. 3 is an opposite end view of the integrated pneumatic pressure regulator assembly of the present invention.
Figure 2:
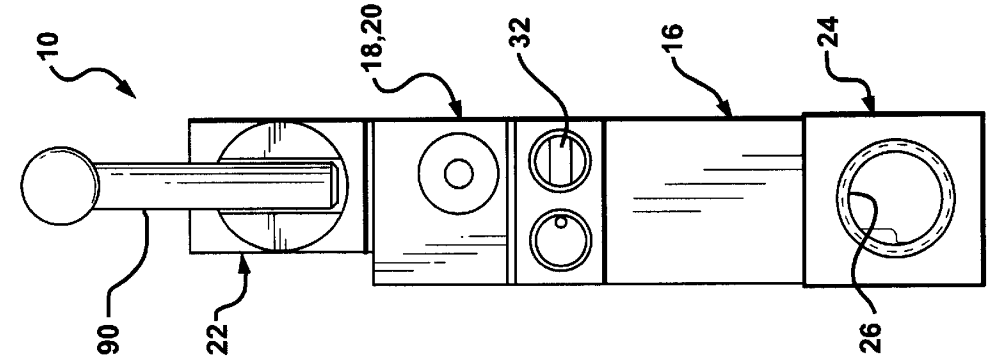
FIG. 2 is an end view of the integrated pneumatic pressure regulator assembly of the present invention.
Figure 1:
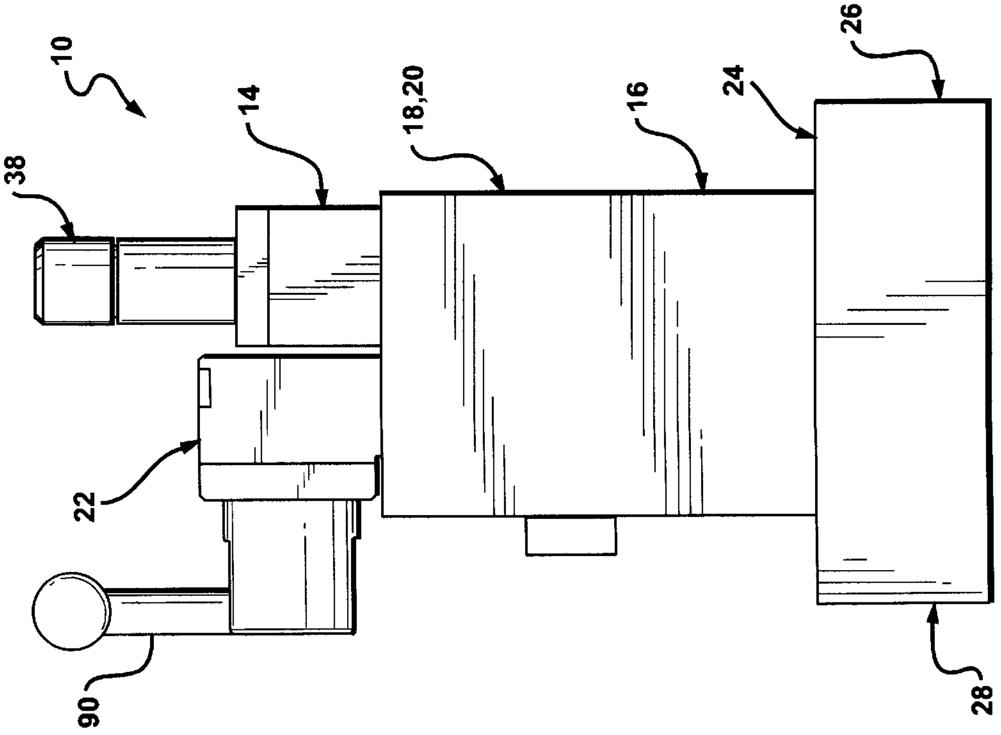
FIG. 1 is a side view of the integrated pneumatic pressure regulator assembly of the present invention.

To this end and as best shown in FIGS. 1–3, the assembly 10 includes a pilot regulator valve, generally indicated at 14, and a pilot operated regulator valve, generally indicated at 16. A quick exhaust valve is housed within the pilot operated regulator valve 16 as will be discussed in greater detail below. A combined flow control valve 18 and sequence valve 20 are disposed between the pilot operated regulator valve 16 and the pilot regulator valve 14. The assembly 10 further includes a control valve 22 mounted next to the pilot regulator valve 14. Together, these components of the assembly 10 form a single, integrated unit which is schematically indicated at 12 in FIGS. 4 through 9. The integrated unit 12 may be mounted to a base 24 having a common inlet 26 which serves the assembly 10 and at least one outlet 28.

Figure 5:
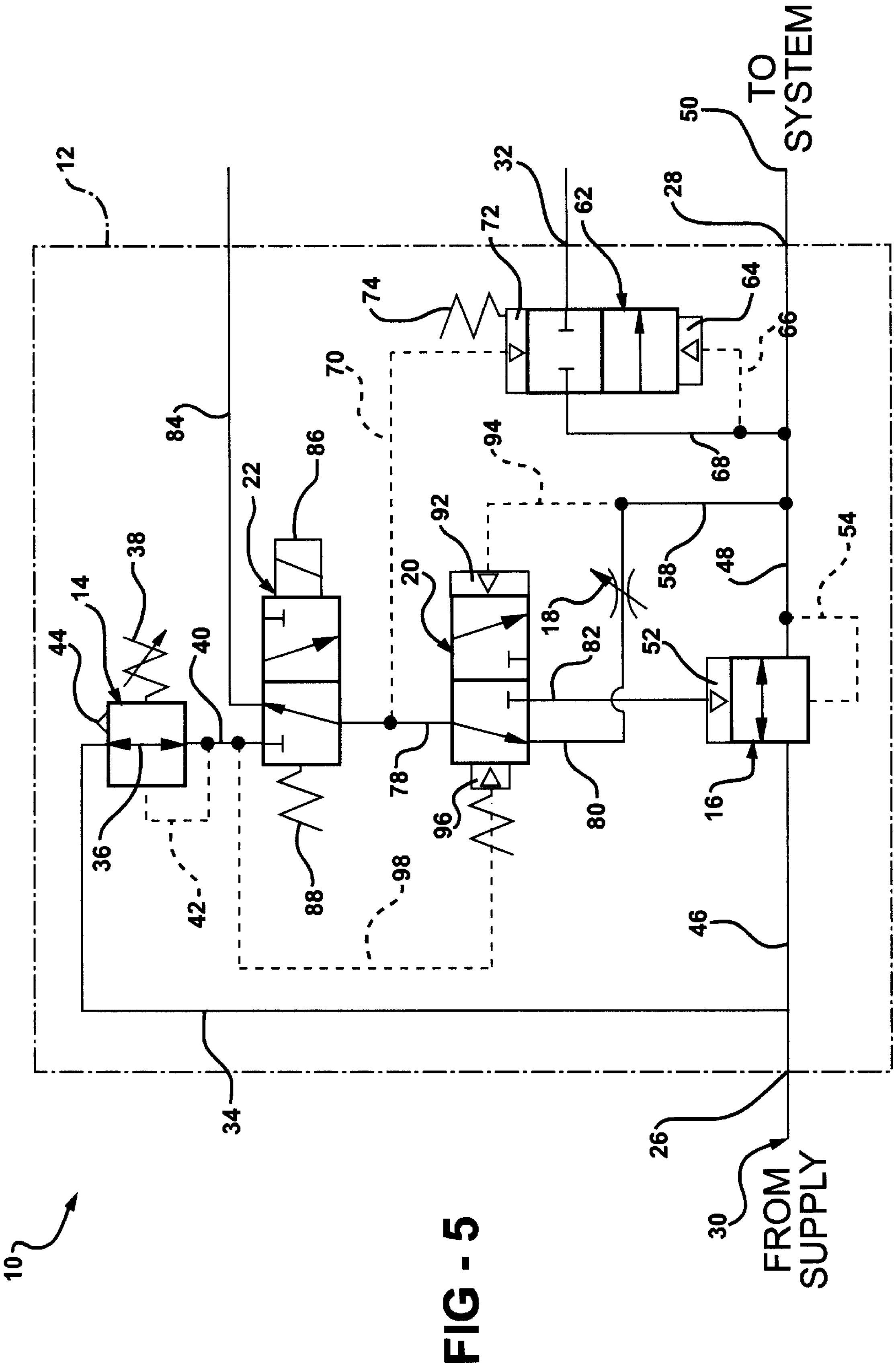
FIG. 5 is a schematic diagram of the integrated pneumatic pressure regulator assembly of the present invention illustrating the system pressure exhausted and the exhaust valve spring biased into the closed position.

Referring now to FIGS. 4 and 5, the integrated pneumatic pressure regulator assembly 10 is schematically shown with the system pressure completely exhausted. The inlet 26 is adapted for fluid communication with a supply of pneumatic pressure, indicated at 30. The outlet 28 is adapted for fluid communication with at least one pneumatically actuated device (not shown). Furthermore, the integrated unit 12 has at least one exhaust port 32. While the preferred embodiment of the assembly illustrated in the figures employs a single outlet 28, those having ordinary skill in the art will appreciate that assembly 10 could employ more than one outlet to service more than one pneumatically actuated device.

The pilot regulator valve 14 is in fluid communication with the inlet 26 via a supply passage 34. The pilot regulator valve 14 includes a valve member schematically represented at 36 and a manually adjustable biasing member 38 (also shown in FIGS. 1 and 3) which together translate the supply pressure 30 into a pilot pressure flowing through line 40. The pilot pressure may be varied by manually adjusting the biasing member 38 which controls the pressure of the air which flows through the pilot regulator valve 14 and therefore line 40. A feedback line 42 may be employed to monitor the pilot pressure in line 40 as is commonly known in the art. The pilot regulator valve 14 may also include a vent 44 for reducing excess pilot pressure when necessary.

The pilot operated regulator valve 16 is in fluid communication with the inlet 26 via passage 46 as well as outlet 28 via delivery passage 48. As will be discussed in greater detail below, the regulator valve 16 is responsive to the pilot pressure from line 40 to regulate the supply pressure 30 delivered through the inlet 26 to a predetermined system pressure, indicated at 50, and delivered through the outlet 28 to a pneumatically actuated device during normal operation. The regulator valve 16 may include a valve member (not shown in detail) having a piston, schematically represented at 52, which is responsive to the pilot pressure to open the regulator valve 16 so as to translate supply pressure 30 to system pressure 50 as shown in FIG. 7. A feedback line 54 may be employed to monitor the system pressure 50 produced by the regulator valve 16 as a means to counter balance the valve member.

The assembly 10 further includes an adjustable flow valve 18 in fluid communication with the outlet 28. As shown in FIG. 6, the adjustable flow valve 18 is responsive to pilot pressure originating in line 40 during the initial actuation of a pneumatically actuated device to increase the pressure delivered to the outlet 28 at a predetermined rate until the pressure at the outlet 28 has reached the predetermined system pressure 50. The adjustable flow valve 18 may be a needle valve, venturi, or any other similar device which restricts air flow so as to attenuate the rate of pressure increase in the passage 58 downstream of the flow control valve 18. In the case of a needle valve, it may be adjusted by adjusting the threaded valve member indicated at 60 in FIG. 3. The passage 58 is in fluid communication with the outlet 28 through delivery passage 48.

An exhaust valve, generally indicated at 62, is in fluid communication with the outlet 28 and is operable to exhaust the system pressure 50 through the exhaust port 32 during shutdown of the pneumatically actuated device as illustrated in FIGS. 4 and 9. The exhaust valve 62 may employ a pressure-balanced valve member which is responsive as indicated at 64 to the pressure in the delivery passage 48 through a passage 66 on line 68. The pressure balanced valve member is also responsive to the pressure in passage 70 as indicated at 72. Thus, depending on the pressure acting on the valve member at 64 and 72, the exhaust valve member is moved between an open and closed position. When the exhaust valve 62 is open, as shown in FIGS. 4 and 9, system pressure 50 is exhausted through delivery passage 48 and line 68, through the exhaust valve 62 and out exhaust port 32. On the other hand, as shown in FIGS. 6 and 8, when the exhaust valve 62 is closed, system pressure 50 cannot escape the unit 12 through the exhaust port 32. As shown in FIGS. 5 and 9, the exhaust valve may also include a return spring, schematically shown at 74 and located at 72, to aid in biasing the valve member (not shown) to the closed position.

As noted above, the assembly also includes a control valve, generally indicated at 22, which performs a number of functions. More specifically, the control valve 22 controls the flow of pilot pressure through the line 40 to the regulator valve 16 via lines 78 and 82 as shown in FIG. 7 as well as the flow of pilot pressure from line 40 to the adjustable flow valve 18 via lines 78 and 80 as shown in FIG. 6. In addition, the control valve 22 is employed for exhausting the pilot pressure from the regulator valve 16 through lines 82, 78 and exhaust line 84, respectively, as shown in FIGS. 8 and 9. At the same time, the control valve acts to exhaust passage 70, removing air pressure from one side 72 of the quick exhaust valve 62. This causes the quick exhaust valve 62 to open and exhaust system pressure 50 out the exhaust port 32. The control valve 22 also exhausts system pressure 50 through the adjustable flow valve 18 and through exhaust line 84 via lines 80,78, respectively, as shown in FIG. 4. The control valve 22 may be of any type, but in the preferred embodiment, it is an electromagnetically actuated valve which is moved between predetermined positions under the biasing influence of a solenoid 86 and a return spring 88. Alternatively, and as illustrated in FIGS. 1 and 2, the control valve 22 may include a handle 90 for manual actuation of the valve, as is commonly known in the art.

The sequence valve, generally indicated at 20, is interposed between the control valve 22 and the pilot operated regulator valve 16 as well as the adjustable flow valve 18. The sequence valve 20 receives pilot regulator pressure through lines 40 and 78. The sequence valve 20 then sequences the pilot pressure between the adjustable flow valve 18, through line 80, during initial actuation of the pneumatically actuated device as shown in FIG. 6 and the regulator valve 16, through line 82, during normal operation of the pneumatically actuated device as shown in FIG. 7. The sequencing valve 20 also provides a flow path through the control valve 22 to exhaust the pilot pressure from the regulating valve 16 through exhaust line 84 via lines 82 and 78, respectively, as shown in FIGS. 8 and 9. The sequencing valve 20 also acts to provide a flow path to exhaust the system pressure 16 through passage 58, adjustable flow valve 18, lines 80 and 78, control valve 22 and exhaust line 84, respectively, as shown in FIG. 4. The sequencing valve 20 may include a pressure balanced valve member which is responsive as indicated at 92 to system pressure 50 through passage 58 and feedback passage 94. The pressure balanced valve member is also responsive as indicated at 96 to a spring bias and pilot regulator pressure 40 through feedback line 98.

It will be appreciated by those having skill in the art that while the present invention is illustrated in FIGS. 1–3 as being an assembly of distinct components, it is possible that each of the pilot regulator valve 14, pilot operated regulator valve 16, adjustable flow valve 18, exhaust valve 62, control valve 22 and sequence valve 20, or any sub-combination of these components, may be incorporated into a single housing, schematically represented at 12 in FIGS. 4–9, and having a common inlet 26, outlet 28, and exhaust port 32.

OPERATION

Referring now to FIGS. 4 and 5, the integrated pressure regulator assembly 10 is shown with the control valve 22 deenergized and system pressure 50 exhausted via either exhaust port 32 or exhaust line 84 through related lines and passages that are open as shown in these figures. Pilot pressure is interrupted to the pilot operated regulator valve 16 and, accordingly, the pilot operated regulator valve 16 is shut. Thus, any pneumatically actuated device serviced by the regulator assembly 10 is not receiving any pressure and is therefore shut down.

In FIG. 6, the control valve 22 has been energized, for example during start up of a pneumatically actuated device. Here, the solenoid 86 has been actuated moving the control valve member to the left as viewed in the Figures allowing pilot pressure to flow from lines 78 and 80 through the sequencing valve 20 and flow valve 18 to the outlet 28 whereupon it is delivered to the pneumatically actuated device (not shown). The adjustable flow valve 18 acts to slowly build the pressure received by the pneumatic device. In this state, the pressure acting on the exhaust valve member at 72 through passage 70 overcomes any force acting on the exhaust valve member at 64. Thus, the exhaust valve 62 is closed. However, in this disposition, the sequencing valve 20 does not provide pilot pressure to the pilot operated regulator valve 16 so it also remains closed. This state will continue until the system pressure 50 has increased to the point that the pressure acting on the sequence valve member at 92 through feedback line 94 overcomes any opposing force created by the pressure acting on the sequence valve member at 96 through line 98 and the spring bias.

When this occurs, as illustrated in FIG. 7, pilot pressure is delivered from the pilot regulator valve 14, through line 40, the control valve 22, line 78, sequence valve 20 and through line 82 to the pilot operated regulator valve 16. The pilot pressure opens the pilot operated regulator valve to allow supply pressure 30 to flow through passage 46 at a predetermined, regulated system pressure 50 communicated through the outlet 28 of the unit 12 via delivery passage 48 to the pneumatically actuated device. Note that the exhaust valve 62 remains closed. While the assembly is in this state, normal operation of the pneumatic device may continue.

In the event of a shut down of the pneumatically actuated device such as at the end of a production shift, during a break in production, or an emergency, the control valve 22 is deenergized as illustrated in FIG. 8. In this state, the control valve member is shifted to the right as viewed in the Figures under the biasing influence of the spring 88. At the same time, the sequencing valve 20 shifts to the right under the influence of the biasing spring and pilot pressure acting at 96. Pilot pressure is interrupted to the pilot operated regulator valve 16 and pilot pressure acting on the regulator valve 16 at 52 begins to exhaust through exhaust line 82, 78 and 84, respectively. At this point, the exhaust valve 62 is still closed. However, once the pressure acting on the exhaust valve member at 72 through passage 70 has reduced to a certain level, the exhaust valve member will shift to its open position as indicated in FIG. 9. System pressure 50 is then quickly exhausted. Once this has occurred, pilot pressure and the spring bias acting on the sequence valve member at 96, shifts the sequence valve member to completely open the system pressure to the ambient as shown in FIG. 4.

Thus, the present invention provides a pressure regulator having an integrated control valve with slow pressure build and quick exhaust capabilities in a single assembly 10. The present invention therefore eliminates the need for separate start up flow control valves as well as quick exhaust valves which must be separately located and controlled throughout a pneumatic system. This simplifies the design of pneumatically actuated systems which leads to reduced costs, increased efficiency and convenience.

The invention has been described in an illustrative manner. It is to be understood that the terminology which has been used is intended to be in the nature of words of description rather than of limitation. Many modifications and variations ofthe invention are possible in light of the above teachings. Therefore, within the scope of the appended claims, the invention may be practiced other than as specifically described.

What is claimed is:

1. An integrated pneumatic pressure regulator assembly, said assembly comprising:

an inlet adapted for fluid communication with a supply of pneumatic pressure, at least one outlet adapted for fluid communication with at least one pneumatically actuated device, and at least one exhaust port;

a pilot regulator valve in fluid communication with said inlet and operable to provide a pilot pressure;

a pilot operated regulator valve in fluid communication with said inlet and said at least one outlet, said pilot operated regulator valve being responsive to said pilot pressure to regulate said supply pressure from said inlet to a predetermined system pressure delivered through said at least one outlet to a pneumatically actuated device during normal operation;

an adjustable flow valve in fluid communication with said at least one outlet and responsive to said pilot pressure during initial actuation of a pneumatically actuated device to increase the pressure delivered to said outlet at a predetermined rate until the pressure at said outlet has substantially reached said predetermined system pressure; and an exhaust valve in fluid communication with said outlet and operable to exhaust said system pressure through said at least one exhaust port during shut down of the at least one pneumatically activated device.

2. An assembly as set forth in claim 1 further including a control valve for controlling the flow of pilot pressure to said pilot operated regulator valve and said adjustable flow valve and for exhausting said pilot pressure from said regulator valve and said system pressure through said exhaust valve.

3. An assembly as set forth in claim 2 further including a sequence valve interposed between said control valve and said pilot operated regulator valve as well as said adjustable flow valve for sequencing pilot pressure between said adjustable flow valve during initial actuation of the at least one pneumatically actuated device and said pilot operated regulator valve during normal operation of the pneumatically actuated device and providing a flow path to exhaust said pilot pressure from said regulator valve and to exhaust said system pressure through said exhaust valve.

4. An assembly as set forth in claim 1 wherein said pilot operated regulator valve includes a feedback line in fluid communication with said outlet to monitor said system pressure produced by said pilot operated regulator valve.

5. An assembly set forth in claim 1 wherein said pilot operated regulator valve includes a piston which is responsive to said pilot pressure to open said regulator valve so as to translate said supply pressure to said predetermined system pressure.

6. An assembly as set forth in claim 1 wherein said pilot regulator valve includes a valve member and an adjustable biasing member, said adjustable biasing member cooperating with said valve member to translate said supply pressure into said pilot pressure.

7. An assembly as set forth in claim 6 wherein said biasing member is manually adjustable.

8. An assembly as set forth in claim 1 wherein said pilot regulator valve includes a feedback line in fluid communication with said pilot pressure for monitoring same.

9. An assembly as set forth in claim 1 wherein said pilot regulator valve includes a vent for selectively reducing excess pilot pressure within said pilot regulator valve.

10. An assembly as set forth in claim 1 wherein said adjustable flow valve is a needle valve.

11. An assembly as set forth in claim 2 wherein said exhaust valve includes a pressure balanced valve member which is responsive to the pressure at said outlet of said assembly as well as the pressure flowing through said control valve to move between an open and closed position.

12. An assembly as set forth in claim 11 wherein said pressure balanced valve member has two sides, said control valve acting to selectively exhaust pressure from one side of said pressure balanced valve member to selectively open said exhaust valve.

13. An assembly as set forth in claim 12 wherein said control valve acts to selectively provide pressure to the other of said two sides of said pressure balanced valve member to close said exhaust valve.

14. An assembly as set forth in claim 2 wherein said control valve is an electromagnetically actuated valve.

15. An assembly as set forth in claim 14 wherein said control valve includes a solenoid and a return spring.

16. An assembly as set forth in claim 2 wherein said control valve is manually actuated.

* * * * *

UNITED STATES PATENT AND TRADEMARK OFFICE

CERTIFICATE OF CORRECTION

PATENT NO. : 6,095,184
DATED : August 1, 2000
INVENTOR(S) : Neff et al.

It is certified that error appears in the above-identified patent and that said Letters Patent is hereby corrected as shown below:

Column 6,
Line 37, "ofthe" should read -- of the --.

Column 7, claim 3,
Line 12, "the pneumatically actuated device" should read -- the at least one pneumatically actuated device --.

Column 8, claim 11,
Line 11, "said outlet" should read -- said at least one outlet --.

Signed and Sealed this

Fourth Day of December, 2001

*Attest:*

Nicholas P. Godici

NICHOLAS P. GODICI

*Attesting Officer* *Acting Director of the United States Patent and Trademark Office*